(12) United States Patent
Gonzales et al.

(10) Patent No.: US 11,874,243 B1
(45) Date of Patent: Jan. 16, 2024

(54) METHODS AND APPARATUS FOR REMOTE JOINT ISOLATION MONITORING

(71) Applicant: GPT Industries, LLC, Wheat Ridge, CO (US)

(72) Inventors: Gabriel Gonzales, Westminster, CO (US); Nicholas Bander, Littleton, CO (US); Ian Kinnear, Arvada, CO (US); Aaron Alfano, Littleton, CO (US); Tim Hurley, Littleton, CO (US); Wade Troutman, Littleton, CO (US)

(73) Assignee: GPT Industries, LLC, Wheat Ridge, CO (US)

( * ) Notice: Subject to any disclaimer, the term of this patent is extended or adjusted under 35 U.S.C. 154(b) by 4 days.

(21) Appl. No.: 17/584,165

(22) Filed: Jan. 25, 2022

Related U.S. Application Data (60) Provisional application No. 63/141,861, filed on Jan. 26, 2021.

(51) Int. Cl.
*G01N 27/04* (2006.01)
*F16L 58/18* (2006.01)

(52) U.S. Cl.
CPC ............ *G01N 27/041* (2013.01); *F16L 58/18* (2013.01)

(58) Field of Classification Search
CPC ............................... G01N 27/041; F16L 58/18
See application file for complete search history.

(56) References Cited

U.S. PATENT DOCUMENTS

| | | | | |
|---|---|---|---|---|
| 2015/0240627 A1* | 8/2015 | Gao | ........................ | E21B 47/13 |
| | | | | 324/700 |
| 2016/0183484 A1* | 6/2016 | Richings, Sr. | ....... | A01G 25/167 |
| | | | | 239/11 |

FOREIGN PATENT DOCUMENTS

| | | | |
|---|---|---|---|
| JP | 2591974 B2 | * | 3/1997 |
| JP | 2010001549 A | * | 1/2010 |

* cited by examiner

*Primary Examiner* — Jay Patidar
(74) *Attorney, Agent, or Firm* — Perkins Coie LLP (57) ABSTRACT

The present application provides an isolation testing unit for a pipeline segment having an isolation junction is provided. The isolation testing unit includes, among other things, an isolation monitoring device that allows for constant monitoring of an isolation parameter at a display with a graphical user interface. The isolation testing unit may include a potentiometer for measuring a potential on an upstream portion of a pipe and a downstream portion of a pipe. The effectiveness of the isolation is determined by the difference between the potentials.

20 Claims, 11 Drawing Sheets

FIG. 1

Option 1 – RFIT

FIG. 2

Option 2 – Clamp-on Ammeter

FIG. 3

Option 3 – Flange to Soil Potentials

```
Time 1
if (Flange1_Voltage[0] > Diff[0])
//((Flange1_Voltage[0] - Flange2_Voltage[0]) < Diff[0])
    LED1 = 1 // LED Red
    else
    LED1 = 0 // LED Green
endif
if(Flange1_Voltage[0] == Flange2_Voltage[0]) //if flange potentials are equal
    LED_Bar = 10
endif
if(Sensi[0] <= Abs(Flange2_Voltage[0] - Flange1_Voltage[0])) //Flange 1 is Asset (protected)
    LED_Bar = "5" //all green bars ON for LED bar
    else
    LED_Bar = 5 + (5 - (5 * (Abs(Flange2_Voltage[0] - Flange1_Voltage[0]) / Sensi[0])))
endif
goto 1
```

FIG. 16

METHODS AND APPARATUS FOR REMOTE JOINT ISOLATION MONITORING

CROSS-REFERENCE TO RELATED PATENT APPLICATIONS

This application claims priority to U.S. Provisional Patent Application No. 63/141,861, filed Jan. 26, 2021, entitled "METHODS AND APPARATUS FOR REMOTE JOINT ISOLATION MONITORING," the entire disclosure of which is herein incorporated by reference.

BACKGROUND

The technology of the present application relates to methods and apparatus to remotely monitor and evaluate electrical isolation of isolation joints, including flange isolation kits, monolithic isolation joints, dielectric unions, or the like.

Metal is prone to corrosion. One type of corrosion includes galvanic corrosion, which occurs between metals at a junction, such as the above-mentioned isolation joints.

Pipelines, such as oil & gas pipelines, include long portions of metal pipes with many junctions. Often the pipelines, and the associated junctions, are in remote locations. Additionally, the metal junctions may be buried metal junctions. Soil can exacerbate corrosion of metal. The pipelines, whether buried or not, in remote locations making visual inspection costly and difficult.

To limit corrosion, many pipelines include one or more corrosion mitigation systems. The corrosion mitigation system may include, among other things, cathodic protection systems. A cathodic protection system provides, among other things, a sacrificial metal to corrode rather than the pipeline.

In any event, the electrical isolation joints must maintain electrical isolation, at least within certain tolerances, to be effective. As can be appreciated from the above, however, present systems are less than satisfactory to monitor the effective electrical isolation of the isolation joints. Thus, against this background, it would be desirable to provide an improved methods and apparatus for remotely monitoring isolation joints.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, an isolation testing unit for a pipeline segment having an isolation junction is provided. The isolation testing unit includes, among other things, an isolation monitoring device that allows for constant monitoring of an isolation parameter.

In some embodiments, the isolation testing unit transmits alarms and/or alerts for when the monitored isolation parameter exceeds one or more thresholds associated with decreasing or failed isolation. The transmission of the alarm and/or alert may be a push notification. The push notification may be an email, a text, or a short message service, to name but a few. The isolation testing unit may provide both wired (direct connections such as via a USB port) or wireless data transmission (such as via Wi-Fi, internet, satellite, Bluetooth, or cellular connections).

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to buried pipelines that transport hydrocarbons, such as, for example, oil, gas, or the like. However, the technology described herein may be used with applications other than those specifically described herein. For example, the technology of the present application may be applicable to HVAC pipelines and junctions, power plant pipelines and junctions (such as Nuclear Reactor pipelines and junctions), other fluid transport systems, or the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
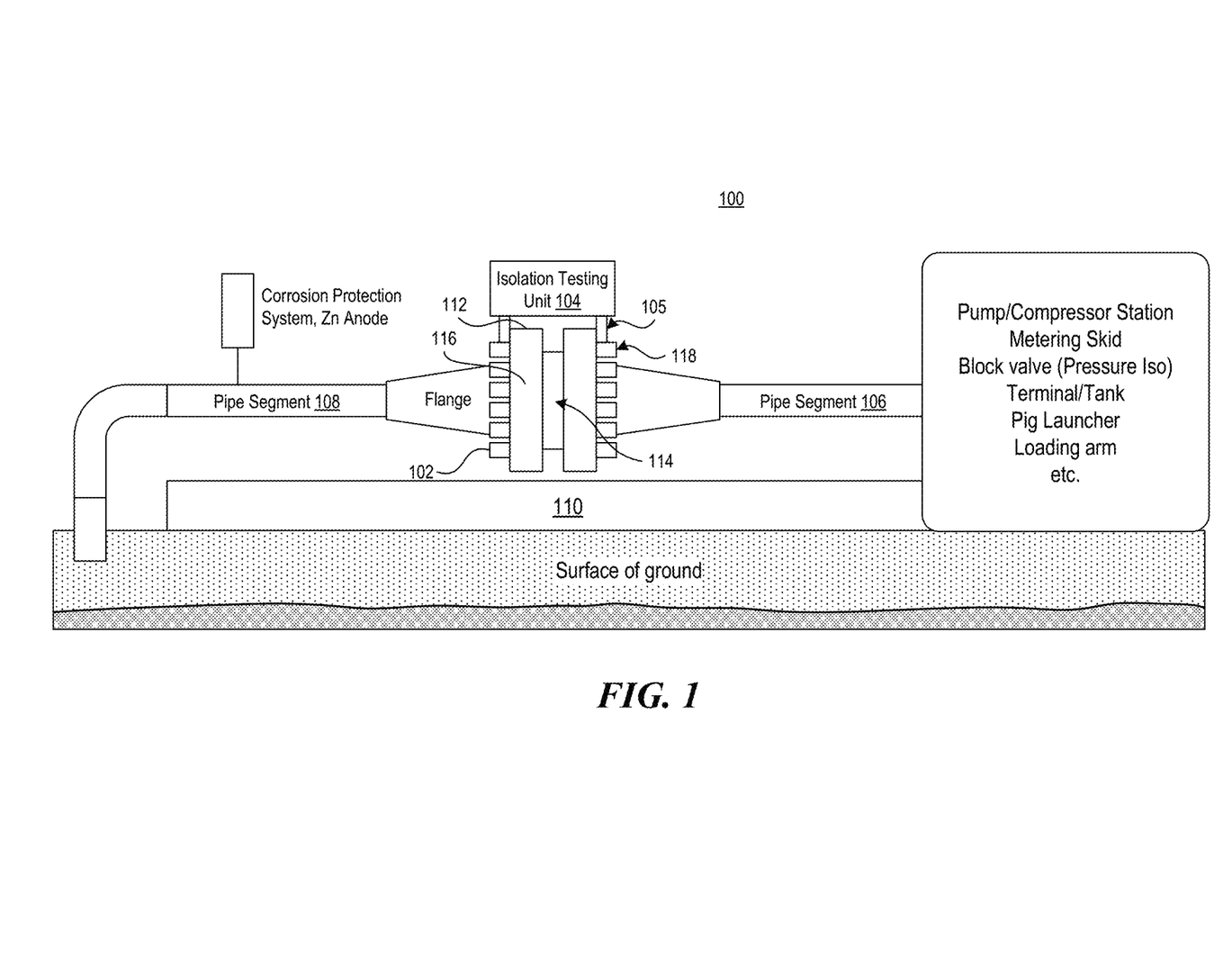
FIG. 1 is a schematic diagram of a pipeline segment with an isolation testing unit consistent with the technology of the present application.

With reference now to FIG. 1, a pipeline segment 100 is shown. Pipeline segment 100 includes a junction 102 (sometimes referred to as a joint 102 or isolation joint 102), consistent with the technology herein, the junction 102 is operatively coupled to an isolation testing unit 104, which will be explained further below. For reference, the pipeline segment 100 has a downstream portion 106, which may be operatively coupled to a pump, compressor skid, valves, tanks, etc., and an upstream portion 108 on opposite sides of the junction 102. The pipeline segment 100 may be above the ground 110 (as shown) or buried by design.

The junction 102 may be any junction as identified above, but for exemplary purposes, the junction herein is an isolation junction. The downstream portion 106 and the upstream portion 108 of the pipeline segment 100 terminate in opposed flanges 112. An isolation gasket 114 is disposed between the opposed sealing surfaces 116 of the opposed flanges 112. The flanges 112 are coupled together by bolts 118, which are typically isolation bolts for an isolation gasket. The isolation gasket 114 may comprise a metal core with a dielectric envelope. The isolation bolts may be metal bolts with dielectric sleeves.

In part because the junction 102 is above ground, the isolation testing unit 104 is mounted directly to the junction 102 by a mounting bracket 105. For embodiments where the junction 102 is buried, or in an otherwise hostile/hazardous environment, the isolation testing unit 104 may be remote from the junction 102 but operatively connected via a wired or wireless connection, as will be explained below. In this case, the junction 102 may be housed in an electrical box or the like to protect the isolation testing unit 104 from the environment.

Figure 2:
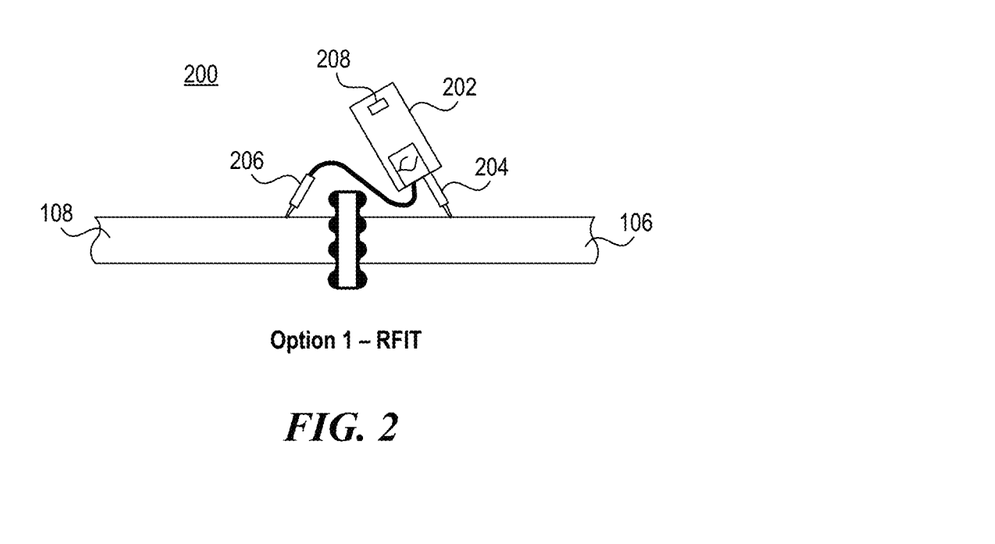
FIG. 2 is a schematic diagram of an isolation testing unit of FIG. 1 consistent with the technology of the present application.
Figure 3:
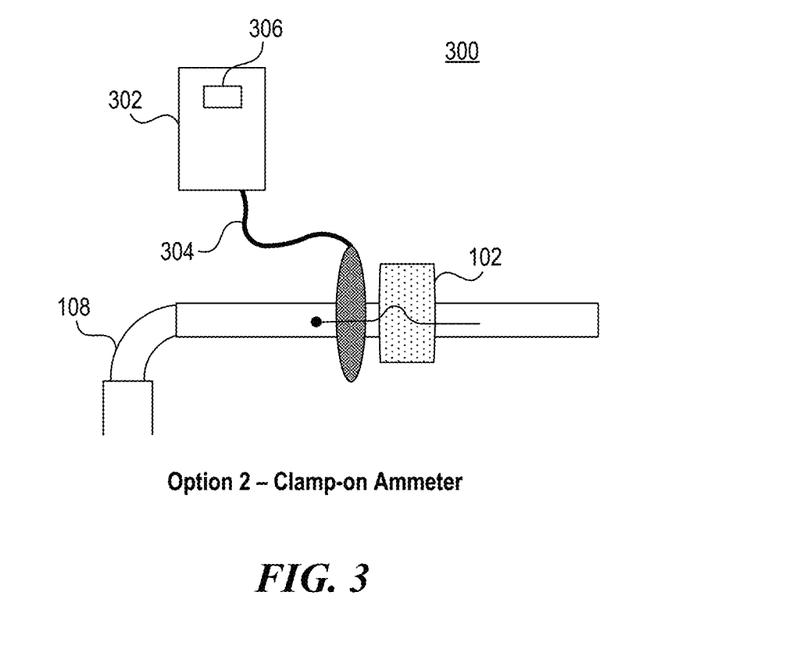
FIG. 3 is a schematic diagram of an isolation testing unit of FIG. 1 consistent with the technology of the present application.
Figure 4:
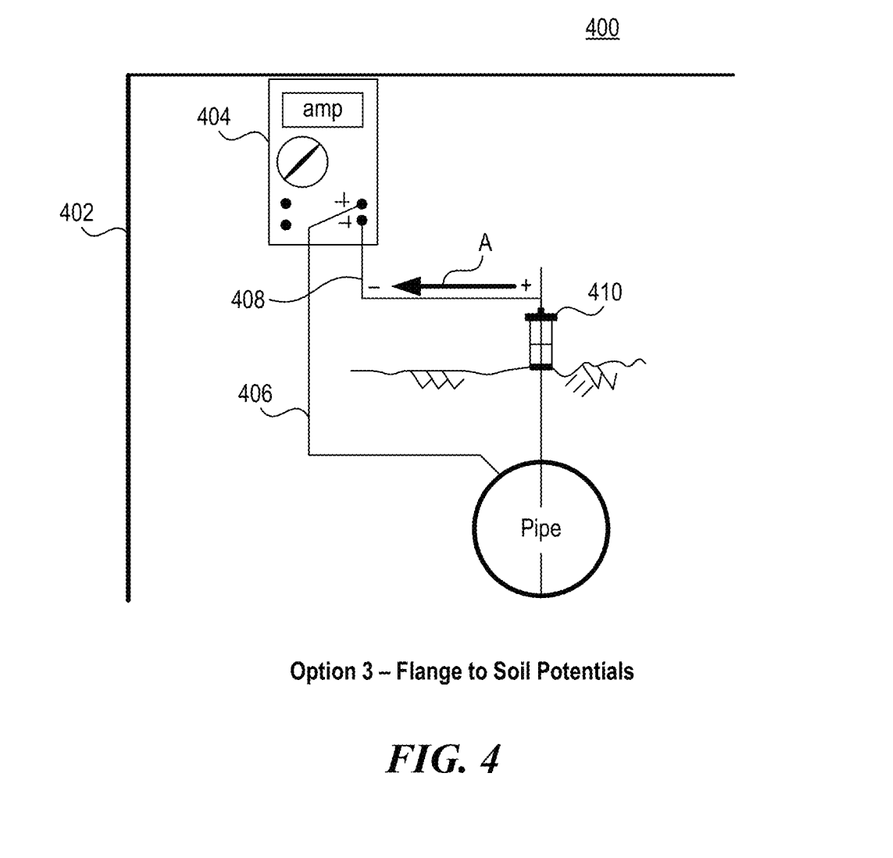
FIG. 4 is a schematic diagram of an isolation testing unit of FIG. 1 consistent with the technology of the present application.

Different configurations of isolation testing units 104 are possible. FIG. 2 shows an isolation testing unit 200 that is a radio frequency isolation tester. FIG. 3 shows an isolation testing unit 300 that is an ammeter. FIG. 4 shows an isolation testing unit 400 that is a flange to soil potentiometer.

With reference back to FIG. 2, the isolation testing unit 200 comprises a radio frequency isolation tester. The radio frequency isolation tester 200 includes a radio frequency signal generator 202 that generates a radio frequency. The radio frequency signal generator 202 includes a positive (or signal) lead 204 that is operatively coupled to one of the downstream portion 106 or upstream portion 108 on opposite sides of the junction 102. The radio frequency signal generator 202 also includes a negative (or receiver) lead 206 operatively coupled to on the other of the downstream portion 106 or upstream portion 108.

In application, the radio frequency signal generator 202 would generate a frequency signal that is applied to, for example, the downstream portion 106 through the positive lead 204. While many frequencies are possible, generally the frequency used by the signal generator 202 should avoid local and/or common frequencies to avoid false readings. For example, frequencies of 50 or 60 hertz should be avoided as they may lead to stray signals based on power lines or electrical equipment. Also, frequencies on line locators should be avoided, which frequencies generally range between about 256 hertz to about 83 kHertz. The radio frequency isolation tester 200 would have the negative lead 206 operatively coupled to the upstream portion 108. The negative lead 206 would receive a radio frequency signal. A comparator 208, or processor specially programmed to compare the applied and received radio frequency signals, would compare the two signals. If the comparator 208, or processor, determines the frequencies of the applied and received signals are the same, or within a predefined tolerance threshold, the isolation has failed. If the signals are not the same frequency or within a predefined tolerance, the isolation is satisfactory. The radio frequency isolation tester would transmit an alert signal via a transceiver, or the like, as will be explained further below.

With reference back to FIG. 3, the isolation testing unit 300 comprises an ammeter 302. The ammeter 302 is described as a clamp on ammeter although the ammeter 302 may be otherwise operatively coupled to the junction 102. The ammeter 302 would have a lead 304 operatively coupled to one side of the junction 102, such as the upstream portion 108 as shown in the exemplary embodiment.

The lead 304 would be operatively coupled to a comparator 306 in the ammeter 302 that would determine whether there is any current signal on the pipeline segment at or over a predetermined threshold value. In a configuration where one side of the Isolation Joint is protected, any current measured, or within a predefined tolerance threshold, would indicate a failure. In a configuration where both sides of an Isolation Joint are protected, equal currents, or within a predefined tolerance threshold, would indicate a failure. Current measured in excess of the threshold value A would indicate the isolation has failed. A transceiver, or the like, would transmit an alert signal regarding the failure.

With reference to FIG. 4, the isolation testing unit 400 comprises a flange to soil potentiometer 402. The potentiometer 402 includes a voltmeter 404. The voltmeter 404 has a positive (or first) lead 406 coupled to the pipe segment 100, which may be called a pipe lead 406. The voltmeter 404 has a negative (or second) lead 408 coupled to a reference electrode 410. In certain embodiments, the reference electrode 410 may be ground or the soil in which the pipeline is buried. The reference electrode 410 has a constant potential and the pipe segment 100 has a variable potential. As shown in the exemplary diagram, the direction of current is shown by arrow A The effectiveness of the isolation using the flange to soil potentiometer 402 is determined by measuring the potential on the pipe segment 100 on both sides of the junction 102. The isolation is considered effective if the potential difference between the protected and unprotected side of the isolation joint is at least 100 mV. If the potential difference is less than 100 mV, this may indicate a short. Also, if the protected side of the junction 102, which is the side coupled to the sacrificial metal, is more negative, with respect to the native potential of the pipe material, the joint is considered isolated or protected as the corrosion rate is relatively low.

Further tests for checking isolation in configurations where protection is applied to one side or both sides of the junction 102, taking potential readings while cathodic protection is interrupted to one of the pipe segments, for example pipe segment 108, when both sides are protected, there should be no change to the noninterrupted pipe segment 106 OR the noninterrupted pipe segment 106 should become more negative when cathodic protection is interrupted to the pipe segment 108. If there is a change to the noninterrupted pipe segment 106 potential reading, especially if the reading on the noninterrupted pipe segment 106 becomes more positive, this may indicate a short. If the magnitude of change in the interrupted pipe segment 108, when cathodic protection is interrupted to pipe segment 108, in the positive direction, is the same on the noninterrupted pipe segment 106, this IS A SHORT.

The flange to soil or pipe to soil potentiometer as described above is an effective tool to measure and monitor the isolation of an isolation joint. However, depending on the specifics of the isolation testing unit, the isolation testing unit may be subject to variance based on the moisture of the ground and/or soil. Specifically, as soil moisture decreases, the pipe-to-soil potential reading should decrease in a predictable manner. In embodiments where the technology is solely being used to monitor isolation, the change in pipe-to-soil potential is not an issue as both sides of the isolation joint are referenced to the same soil and would experience the same decrease (and conversely the same increase if soil moisture increases). However, in certain embodiments, the pipe-to-soil potential is monitored for more than simply isolation effectiveness, the tracking of the soil moisture allows for the algorithm and users to depict whether the pipe-to-soil potential measurements are being influenced from improper amounts of cathodic protection being applied to the pipeline or if soil moisture is causing the decrease or increase in the pipe-to-soil potential readings. Users and the algorithm can evaluate whether cathodic protection needs to be changed (increased or decreased). Generally, an increase in cathodic protection would be for when the potential of the protected side is below the defined protected potential. A decrease in protection would be when there is excess protection voltage, e.g., beyond the protected potential. A decrease in protection is possibly not necessary for the joint isolation but may reduce waste of energy and the like. Thus, the processor may have a separate soil moisture sensor that may generate a push notification if the cathodic protection needs to be adjusted or a push notification if the soil moisture is influencing the pipe-to-soil potential.

Figure 5:
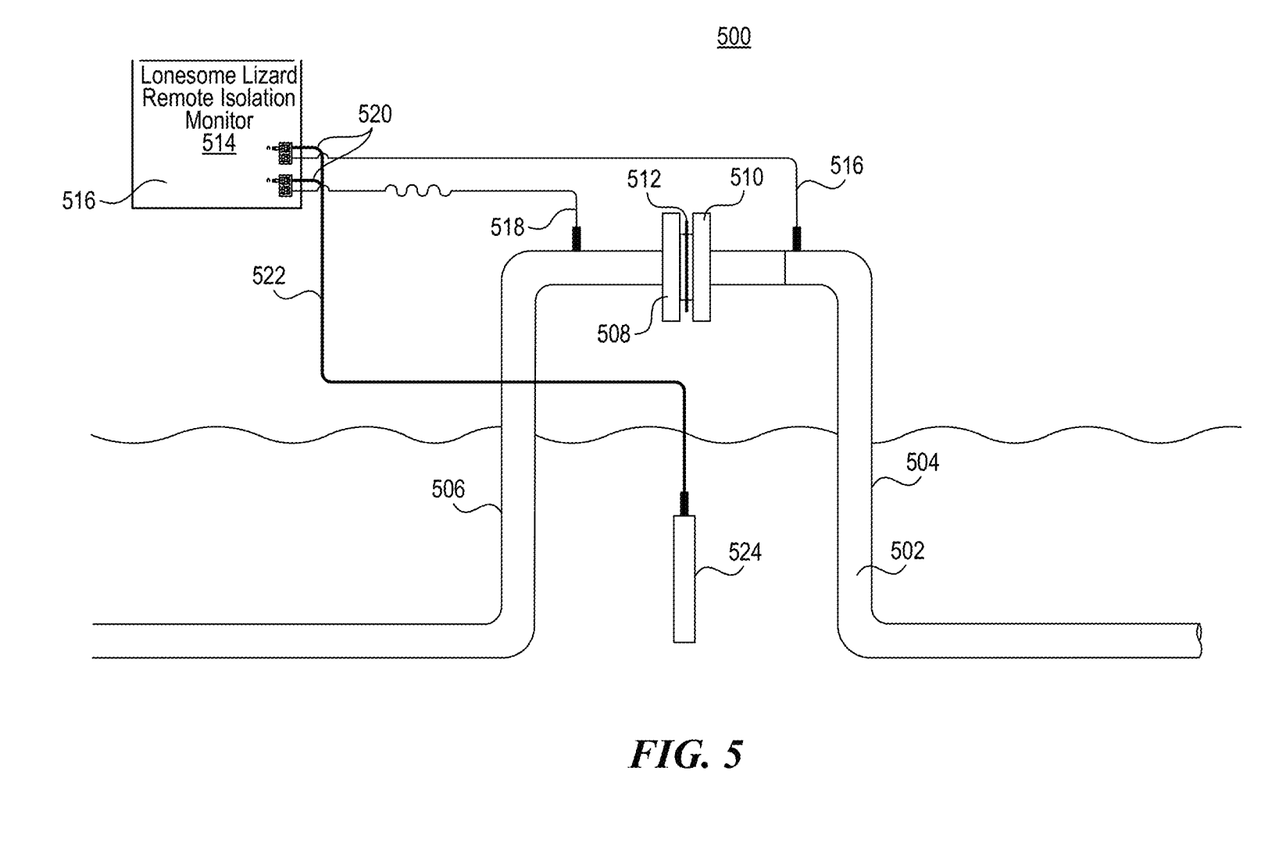
FIG. 5 is a schematic diagram of a pipeline segment with an isolation testing unit consistent with the technology of the present application.

FIG. 5 shows another diagram of an isolation joint and remote monitoring system 500, which is like the systems described above. The system 500 includes a pipeline segment 502 with first (or upstream/downstream) portion 504 and a second (or downstream/upstream) portion 506 coupled together by an isolation joint 508, which comprises a pair of opposed flanges 510 on each of the first and second pipeline segments 502, 504 and a gasket 512. An isolation testing unit 514 is coupled to the first and second portions 504, 506

The isolation testing unit 514 is a potentiometer 516 with a first portion positive lead 516 coupled to the first portion 504 of the pipeline segment 502 and a second portion positive lead 518 coupled to the second portion 506 of the pipeline segment 502. The first portion positive lead 516 and the second portion positive lead 518 should be of equal gauge, length, and/or impedance. Similarly, the potentiometer 516 has a first portion negative lead 520 and a second portion negative lead 522 coupled to the reference electrode 524. Like the positive leads, the first portion negative lead 520 and the second portion negative lead 522 should be of equal gauge, length, and/or impedance.

Figure 6:
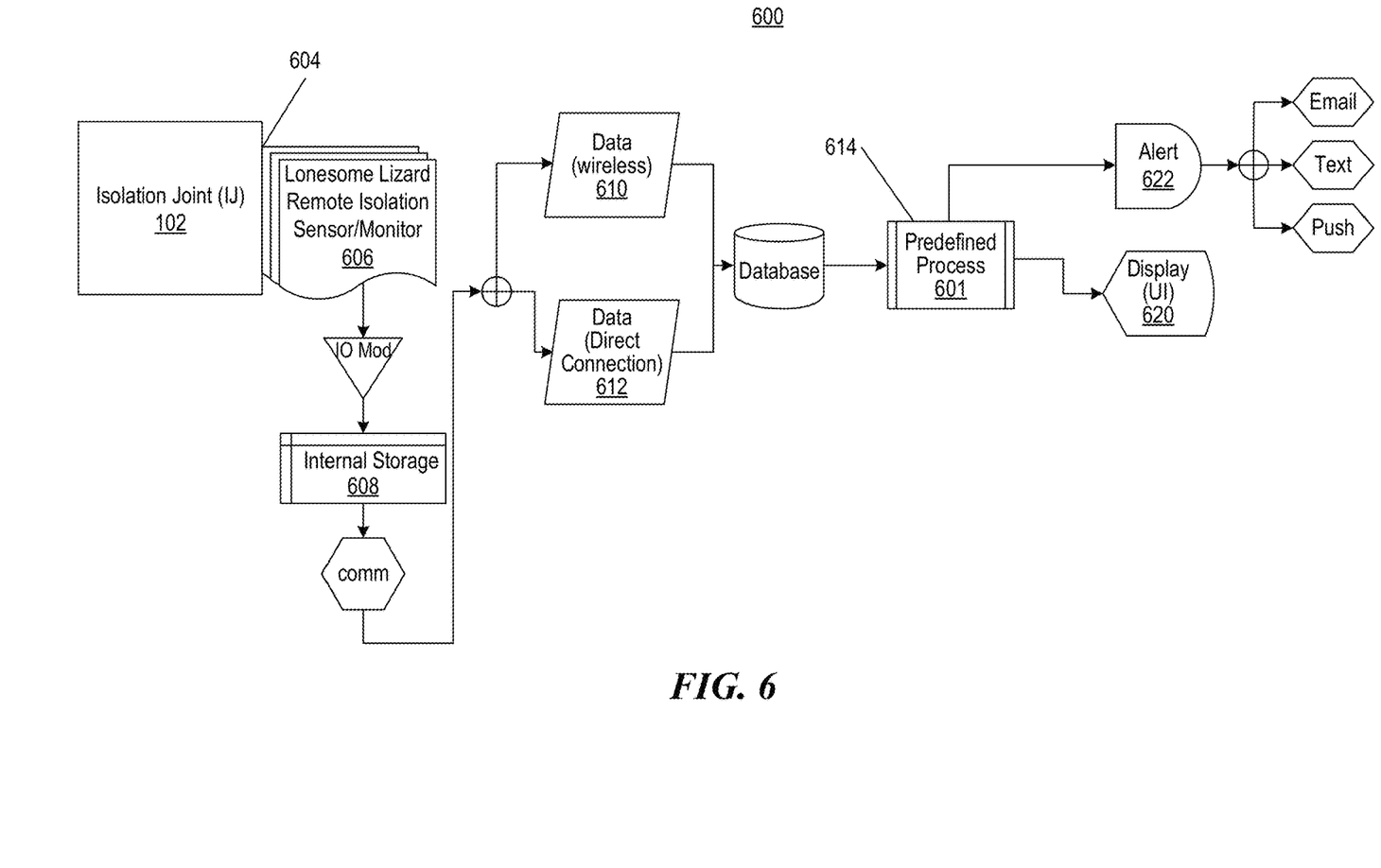
FIG. 6 is a schematic block diagram outlining an exemplary methodology for performing the functions associated with the pipeline and isolation testing unit consistent with the technology of the present application.

As predefined intervals, or continually, the isolation testing unit 514 reads the potential and compares the values to determine whether isolation exists. The differential between the potentials on both sides of the isolation joint should exceed a predefined threshold, such as isolation is proper if the differential is greater than or equal to 100 mV. An exemplary flowchart 600 showing a process for monitoring the isolation junction 102 is shown with reference to a schematic diagram 602. As shown, the isolation testing unit 104 (which may be any of isolation testing units 200, 300, 400) is operatively coupled to the isolation junction 102. The operatively coupling may be mechanical and electrical or just electrical, step 604. The isolation testing unit 514 obtains electrical readings that are associated with the effectiveness of the isolation, step 606. The isolation testing unit 514 may include a processor and memory that execute software routines to obtain the electrical readings and condition the electrical readings for processing, such as, modulation of the signals or analog to digital conversion. The electrical readings, optionally, are stored locally in the memory of the isolation testing unit 514, step, 608. The processor of the isolation testing unit 514 next transmits the electrical readings, after any preprocessing, either wirelessly, step 610, such as using a radio frequency, satellite, or other communication protocol, or wired, step 612, such as using a PCI bus or USB port, to a processor 601. The processor 601, which may include, among other things, a comparator as described above, compares the electrical readings associated with the isolation effectiveness with predefined thresholds, step 614, to determine whether the isolation is effective, step 616, or the isolation is not effective, step 618. The processor 601 then causes a display on a graphical user interface to display the electrical readings, step 620, or a conversion of the electrical readings. If the processor determines based on the comparison that the isolation is effective, step 616, no alerts or alarms are transmitted. If the processor determines based on the comparison that the isolation is not-effective, step 618, the processor transmits an alert and/or an alarm, step 622. The alert and/or alarm may be a push notification, an email, an audio and/or visual alarm (such as a siren and flashing lights), a short message service (such as a text), a prerecorded call, or the like, step 624.

Figure 7:
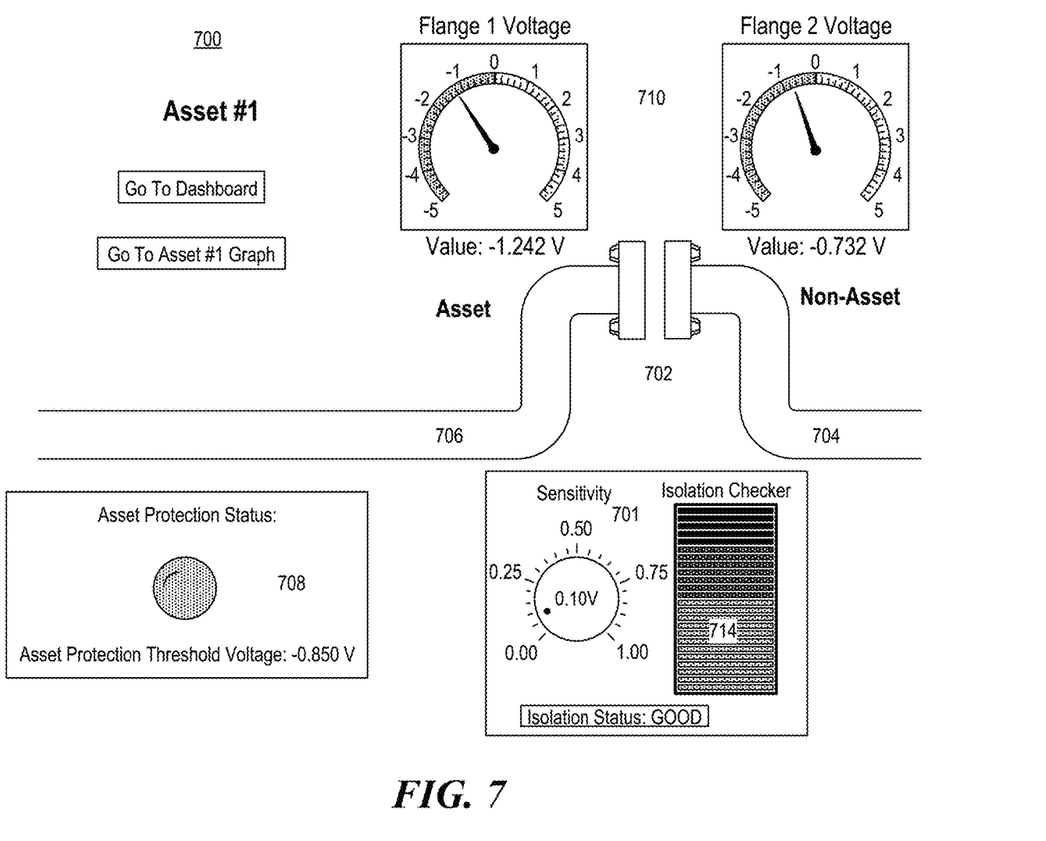
FIGS. 7, 9, 11, and 13 are representative of a graphical user interface consistent with the technology of the present application.
Figure 8:
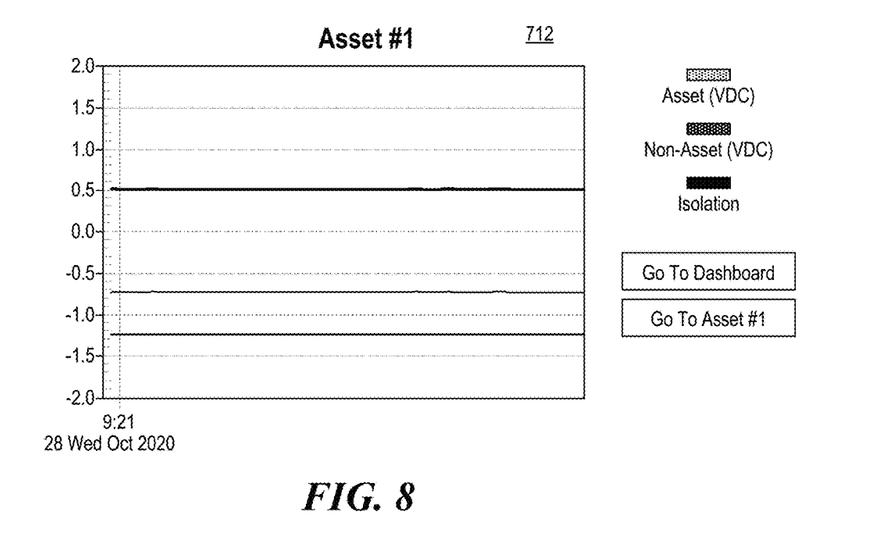
FIGS. 8, 10, 12, and 14 are representative of a graphical user interface consistent with the technology of the present application, which graphical user interface may be used in conjunction with the interface of FIGS. 7, 9, 11, and 13.
Figure 9:
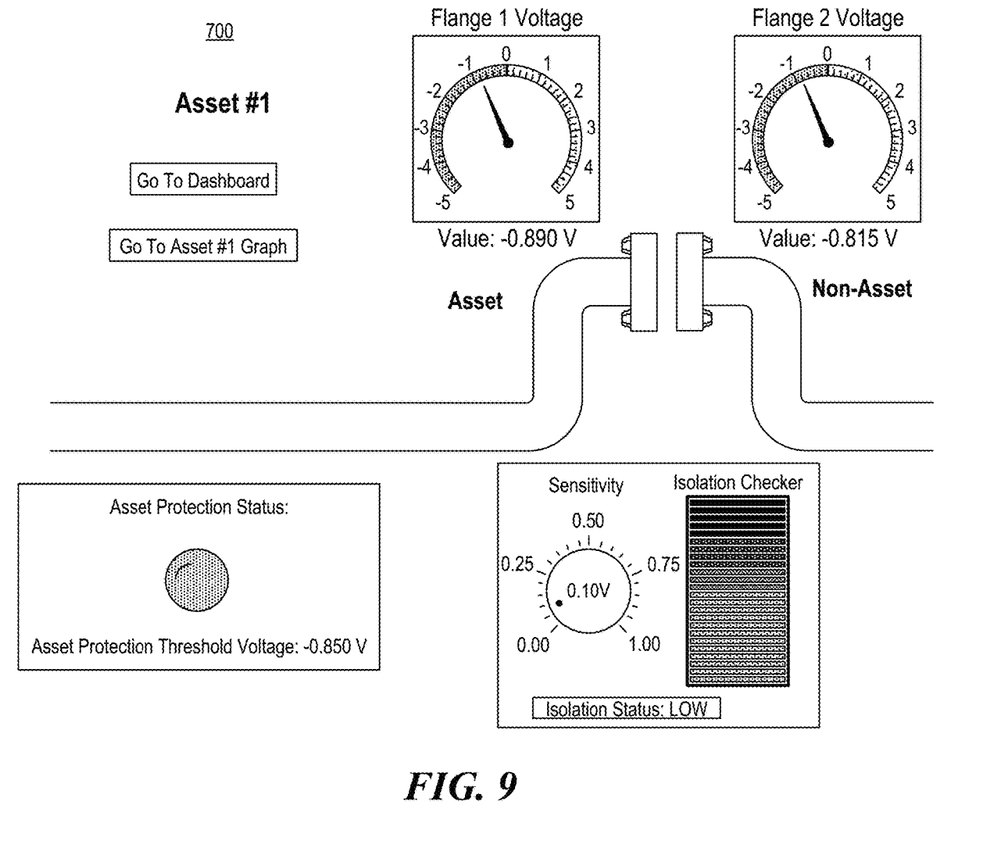
Figure 10:
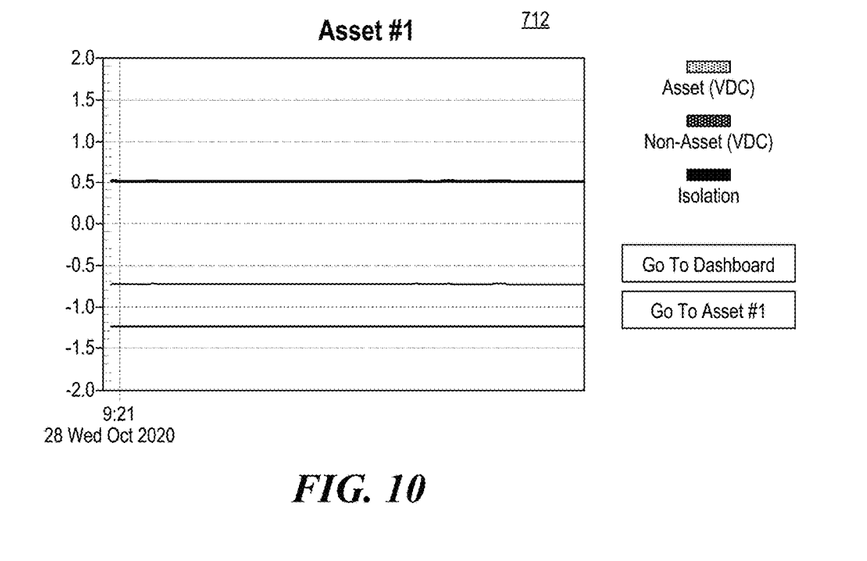
Figure 11:
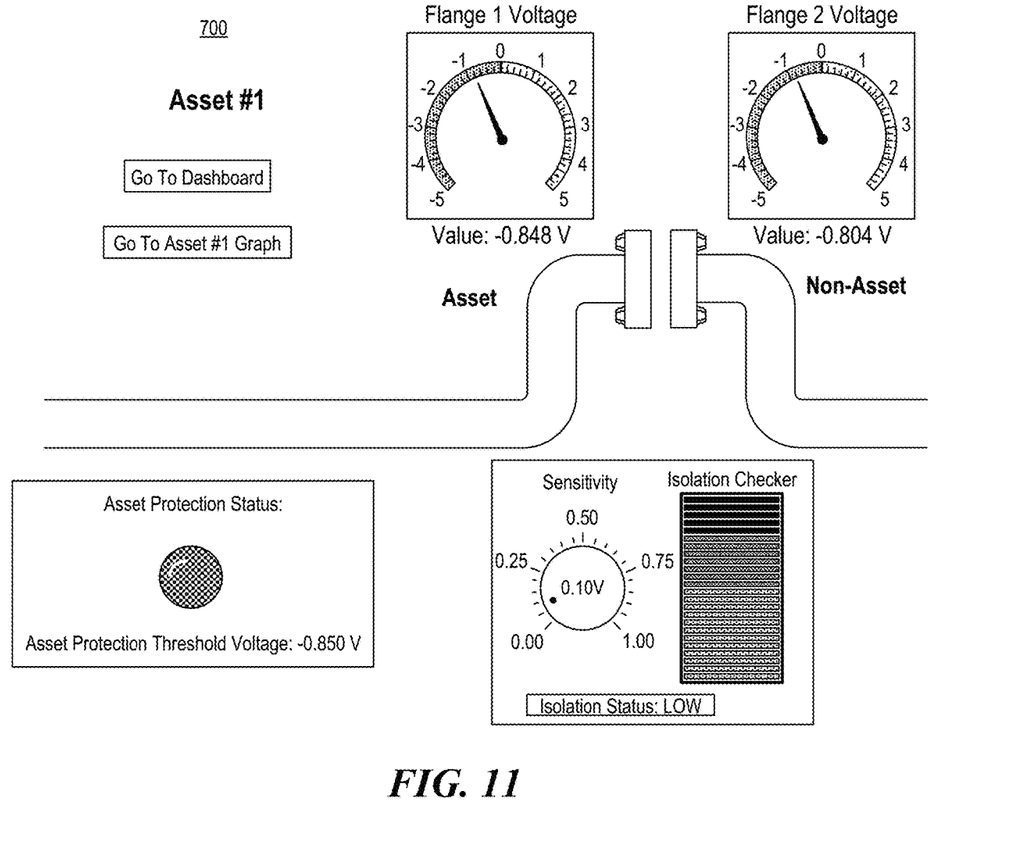
Figure 12:
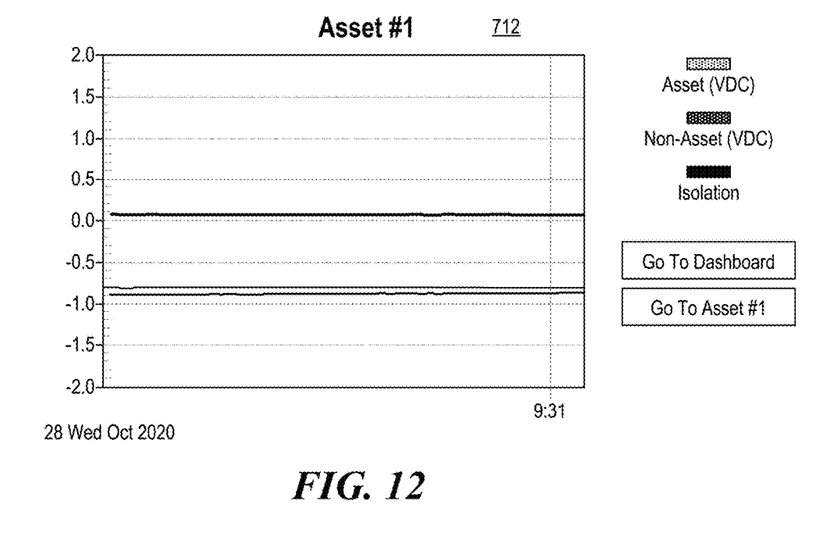
Figure 13:
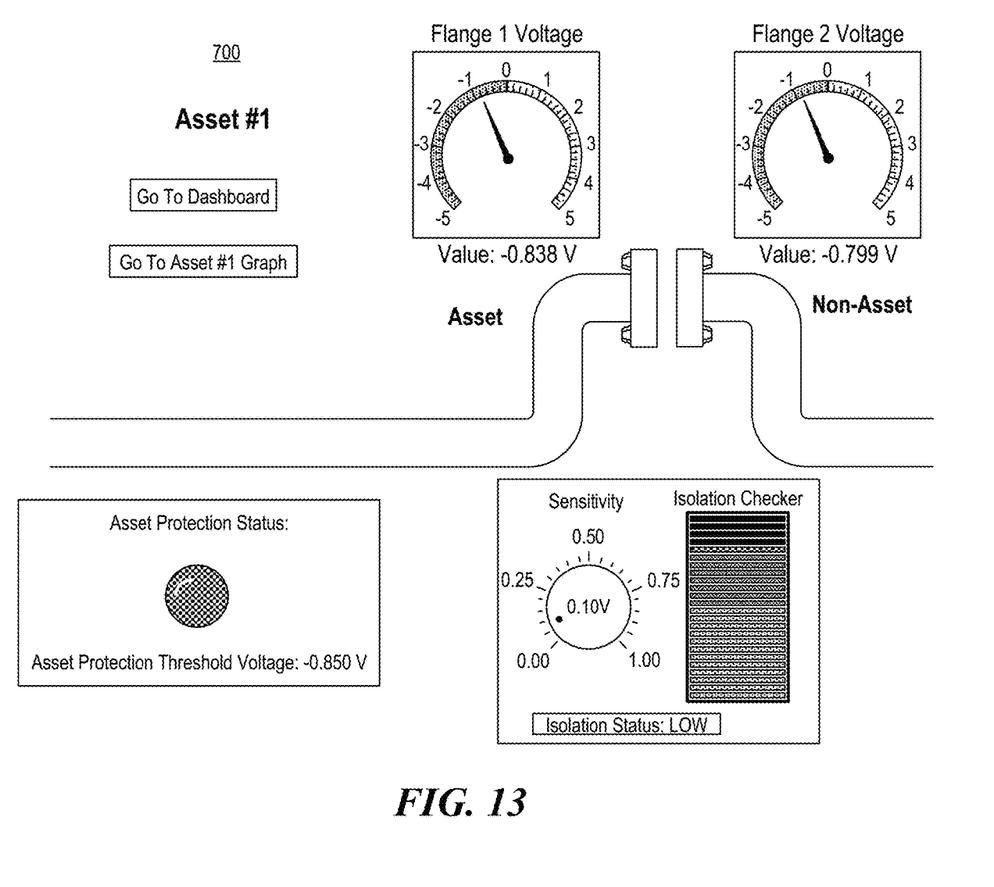
Figure 14:
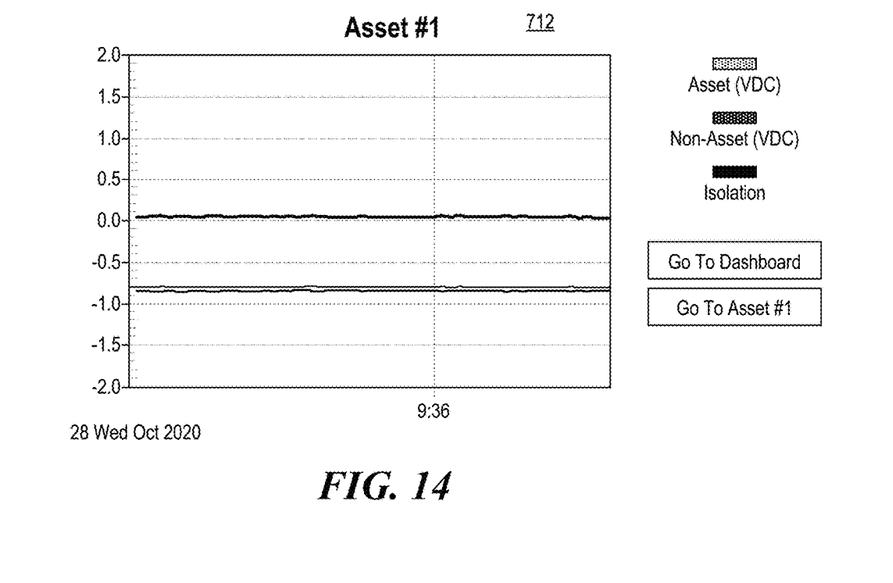
Figure 16:
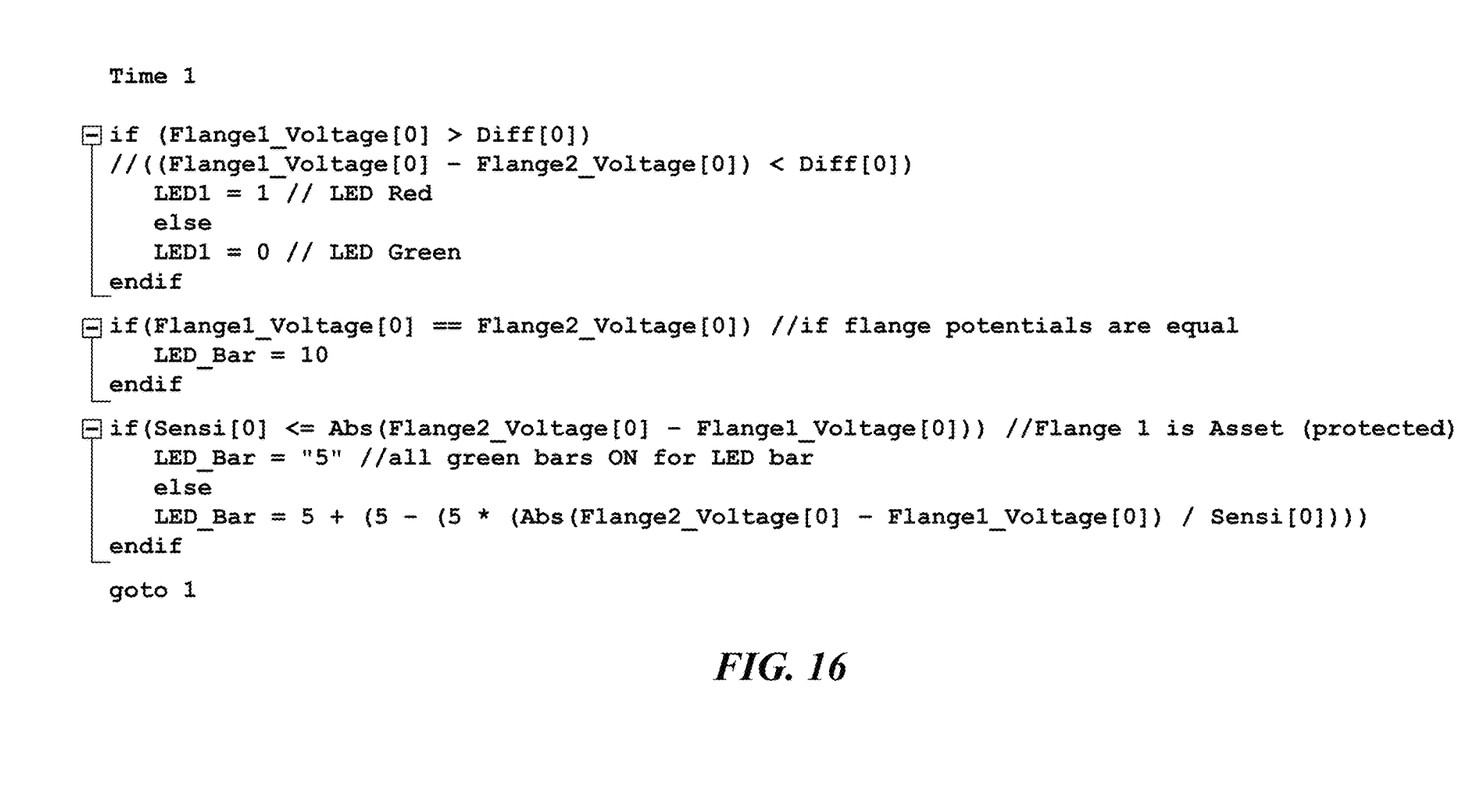
FIG. 16 shows exemplary code for comparator to drive the display and alarm/alerts associated with the functions of the present technology.

With reference now to FIGS. 7-14, graphical user interfaces 700 (or displays 700) are shown with information resulting from the isolation testing unit and methodology. Exemplary code that may be implemented to drive the interface displays is shown in FIG. 16. FIGS. 7 and 8, for example, show a pipe segment 702 where the isolation between the first and second pipe segments 704, 706 is good, as shown by the indicator. The GUI 700 may include actual measured voltage, for this example, as shown by the voltage displays 710. The GUI may have a graph of values 712 as well as a protected status indicator 708. An exemplary, and non-limiting, good isolation may be indicated when the voltage on the asset side of the display is −1.24 and the voltage on the non-asset side is −0.73. FIGS. 9 and 10 show interfaces 700 when the pipe segment has a lower, but still good isolation. The voltage on the asset side in this example, which is non-limiting, may be −0.86 and the voltage on the non-asset side may be −0.80. FIGS. 11 and 12 show low isolation between the asset, which may have an exemplary, and non-limiting, voltage of −0.85, and the non-asset, which may have an exemplary, and non-limiting, voltage of −0.80. Finally, FIGS. 13 and 14 show a failed isolation. In this case, the exemplary, and non-limiting, voltage may be −0.84 on the asset side and −0.08 on the non-asset side of the figures. Also, the difference in the failed isolation voltage is below a 100 mV absolute difference, which indicates a failure from the default settings. The 100 mV absolute difference setting may be adjusted for particular implementations of the technology.

With reference back to, for example, FIG. 7, the GUI 700 has a sensitivity interface 701. The sensitivity interface 701, which is a dial in this exemplary embodiment, allows for the sensitivity of the isolation testing unit 104 to be adjusted in real time. As shown, the increment is presently 0.1 (or 100 mV the absolute difference default setting), but other values may be set depending on the conditions of the junction 102. Also, as can be appreciated by the voltage graphs 712 shown in, for example, FIG. 8, the voltage measurements and isolation value are capable of being tracked in real time by the technology of the present application.

The technology, as described herein, overcomes certain technical deficiencies with conventional monitoring of isolation junctions, especially those located remotely and/or in hazardous environments. The technical deficiencies overcome by the present technology, include, among other things, instantaneous readouts of isolation, consistent and continuous reading and monitoring of isolation, live logging of isolation data, automated notifications (alerts and/or alarms), remote reading and monitoring of remote isolation joints, data analytics, reporting, and the like to name but a few technical deficiencies that may be overcome using the present technology.

Figure 15:
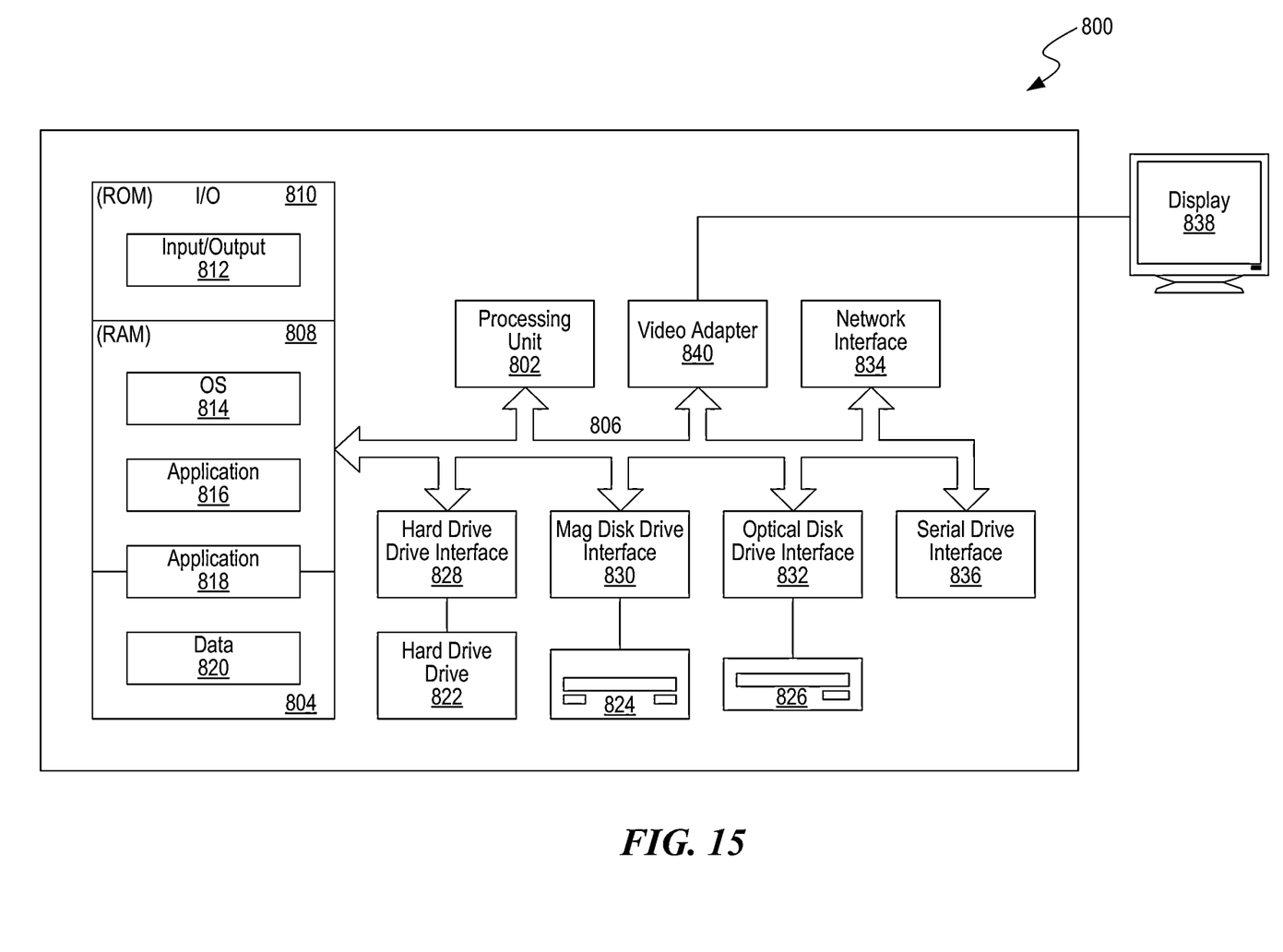
FIG. 15 is a functional block diagram of a device(s) on which the technology of the present application may be implemented.

Referring now to FIG. 15, a functional block diagram of a typical client device 800 for the technology of the present application is provided. Client device 800 is shown as a single, contained unit, such as, for example, a desktop, laptop, handheld, or mobile processor, but client device 800 may comprise portions that are remote and connectable via network connections such as via a LAN, a WAN, a WLAN, a WiFi Network, Internet, or the like. Generally, client device 800 includes a processor 802, a system memory 804, and a system bus 806. System bus 806 couples the various system components and allows data and control signals to be exchanged between the components. System bus 806 could operate on any number of conventional bus protocols. System memory 804 generally comprises both a random access memory (RAM) 808 and a read only memory (ROM) 810. ROM 810 generally stores a basic operating information system such as a basic input/output system (BIOS) 812. RAM 808 often contains the basic operating system (OS) 814, application software 816 and 818, and data 820. System memory 804 contains the code for executing the functions and processing the data as described herein to allow the present technology of the present application to function as described. Client device 800 generally includes one or more of a hard disk drive 822 (which also includes flash drives, solid state drives, etc. as well as other volatile and non-volatile memory configurations), a magnetic disk drive 824, or an optical disk drive 826. The drives also may include zip drives and other portable devices with memory capability. The drives are connected to the bus 806 via a hard disk drive interface 828, a magnetic disk drive interface 830 and an optical disk drive interface 832, etc. Application modules and data may be stored on a disk, such as, for example, a hard disk installed in the hard disk drive (not shown). Client device 800 has network connection 834 to connect to a local area network (LAN), a wireless network, an Ethernet, the Internet, or the like, as well as one or more serial port interfaces 836 to connect to peripherals, such as a mouse, keyboard, modem, or printer. Client device 800 also may have USB ports or wireless components, not shown. Client device 800, typically, has a display or monitor 838 connected to bus 806 through an appropriate interface, such as a video adapter 840. Monitor 838 may be used as an input mechanism using a touch screen, a light pen, or the like. On reading this disclosure, those of skill in the art will recognize that many of the components discussed as separate units may be combined into one unit and an individual unit may be split into several different units. Further, the various functions could be contained in one personal computer or spread over several networked personal computers. The identified components may be upgraded and replaced as associated technology improves and advances are made in computing technology.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The above identified components and modules may be superseded by new technologies as advancements to computer technology continue.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

The invention claimed is:

1. An apparatus, comprising:
   a pipe junction, wherein the pipe junction comprises a first pipe section terminating in a first metal flange and a second pipe section terminating in a second metal flange, wherein the first metal flange is opposed to the second metal flange and first and second metal flanges are separated by an isolation gasket; and
   an isolation testing unit operatively coupled to the pipe junction, the isolation testing unit consisting essentially of:
      a potentiometer having a first pipe lead coupled to the first pipe section and a second pipe lead coupled to the second pipe section and at least one reference lead;
      a single reference electrode that is coupled to the at least one reference lead, and
      a processor comprising a comparator,
      wherein a first pipe section potential as measured between the first pipe section and the reference electrode and a second pipe section potential as measured between the second pipe section and the reference electrode is obtained by the potentiometer, wherein the comparator determines a difference between the first pipe section potential and second pipe section potential and when the comparator determines the difference is greater than or equal to an alert threshold confirms, effective isolation.

2. The apparatus of claim 1 comprising a transmitter wherein the transmitter transmits an alert when the difference is below the alert threshold and the isolation is not effective.

3. The apparatus of claim 2 wherein the transmitter transmits the alert wirelessly.

4. The apparatus of claim 1 wherein the isolation testing unit is mounted on the pipe junction.

5. The apparatus of claim 1 wherein the isolation testing unit is mounted remote from the pipe junction.

6. The apparatus of claim 2 wherein when the comparator determines a difference between the first pipe section and the second pipe section also is below an alarm threshold, the transmitter transmits an alarm.

7. The apparatus of claim 1 wherein the at least one reference lead comprises a first reference lead and a second reference lead.

8. The apparatus of claim 7 wherein the first pipe lead and the second pipe lead are of equal impedance.

9. The apparatus of claim 8 wherein the first reference lead and the second reference lead are of equal impedance.

10. The apparatus of claim 9 wherein the first pipe lead and the second pipe lead are of equal length and gauge and the first reference lead and the second reference lead are of equal length and gauge.

11. The apparatus of claim 1 wherein the potentiometer comprises a voltmeter.

12. An isolation test and monitor assembly for a junction to test and report on an effectiveness of junction isolation, consisting essentially of:
   a potentiometer comprising a voltmeter with an upstream positive lead, a downstream positive lead, an upstream negative lead, and a downstream negative lead;
   a single reference electrode,
   a comparator operatively coupled to the potentiometer; and
   a transmitter,
   wherein the upstream positive lead is configured to be coupled to an upstream portion of the junction and the upstream negative lead is configured to be coupled to the reference electrode and the downstream positive lead is configured to be coupled to a downstream portion of the junction and the downstream negative lead is configured to be coupled the reference electrode,
   wherein the potentiometer measures an upstream portion potential and the potentiometer measures a downstream portion potential,
   wherein the comparator determines whether a difference between the upstream potential and the downstream potential exceeds a threshold, and
   wherein the transmitter transmits a signal when the difference exceeds the threshold.

13. The isolation test and monitor assembly of claim 12 wherein the comparator also determines whether the difference equals the threshold and wherein the transmitter transmits a signal when the difference equals the threshold.

14. The isolation test and monitor assembly of claim 12 wherein the upstream positive lead and the downstream positive lead have the same impedance.

15. The isolation test and monitor assembly of claim 14 wherein the upstream reference lead and the downstream reference lead have the same impedance.

16. The isolation test and monitor assembly of claim 14 wherein the upstream positive lead and the downstream positive lead are equal lengths and equal gauges.

17. The isolation test and monitor assembly of claim 12 wherein the threshold is 100 mVolts.

18. The isolation test and monitor assembly of claim 12 comprising a graphical user interface (GUI) displayed on a display where the GUI comprises:
   a representative image of the junction;
   an indicator providing indicia of a status of isolation of the junction; and
   a real time indication of the measured upstream portion potential, the measured downstream portion potential, and the difference.

19. A method of indicating isolation effectiveness of a joining of two segments of a fluid system comprising:
   providing an isolation testing unit consisting essentially of a potentiometer having a first pipe lead, a second pipe lead and at least one reference lead, and a single reference electrode coupled to the at least one reference lead;
   operatively coupling the provided isolation testing unit to an upstream portion of the fluid system and a downstream portion of the fluid system;
   measuring an upstream potential and a downstream potential;
   determining a difference between the upstream potential and the downstream potential;
   transmitting signal to a display device displaying a graphical user interface (GUI) wherein the GUI has indicia indicating isolation effectiveness, wherein the isolation effectiveness is indicated as effective when it is determined the difference is above a threshold and wherein the isolation effectiveness is indicated as non-effective when it is determined the difference is below the threshold.

20. The method of claim 19 wherein the isolation effectiveness is indicated as effective when it is determined the difference equals the threshold.

* * * * *